United States Patent [19]

Nonaka

[11] Patent Number: 4,921,508
[45] Date of Patent: May 1, 1990

[54] METHOD OF MANUFACTURING MAGNETIC HEAD

[75] Inventor: Takashi Nonaka, Kamakura, Japan
[73] Assignee: Mitsubishi Denki Kabushiki Kaisha, Tokyo, Japan
[21] Appl. No.: 372,655
[22] Filed: Jun. 28, 1989
[51] Int. Cl.$^5$ .............................................. G11B 5/42
[52] U.S. Cl. ...................................... 29/603; 29/407; 360/119
[58] Field of Search .................... 29/603, 407, 593; 360/125–127, 122, 119

[56] References Cited

U.S. PATENT DOCUMENTS 4,689,877  9/1987  Church ................................. 29/603
4,841,625  6/1989  Valstyn ................................. 29/603

FOREIGN PATENT DOCUMENTS 98712  8/1981  Japan .
38919  3/1984  Japan .
145514  6/1987  Japan .

OTHER PUBLICATIONS

"Electrical Detection of End Point Polishing Process of Thin-Film Head"; Kawakami et al.; Journal of Applied Physics; Apr. 1987.

*Primary Examiner*—Carl E. Hall
*Attorney, Agent, or Firm*—Wolf, Greenfield & Sacks

[57] ABSTRACT

A method of manufacturing a magnetic head where the width of upper and/or lower cores projecting from respective core bodies and extending parallel with each other via a gap is changed in advance substantially stepwise toward the free end. Then, the upper and lower cores are polished from the free ends to a position of a stepwise change in the width, thus obtaining a desired throat height.

3 Claims, 8 Drawing Sheets

THROAT HEIGHT VS OVERWRITE CHARACTERISTIC

METHOD OF MANUFACTURING MAGNETIC HEAD

FIELD OF THE INVENTION

This invention relates to the setting of a throat height, i.e., depth of the gap between upper and lower cores of a thin film magnetic head used for recording and reproduction of data on and from a magnetic recording medium such as a magnetic disk.

DESCRIPTION OF THE PRIOR ART

Figure 9:
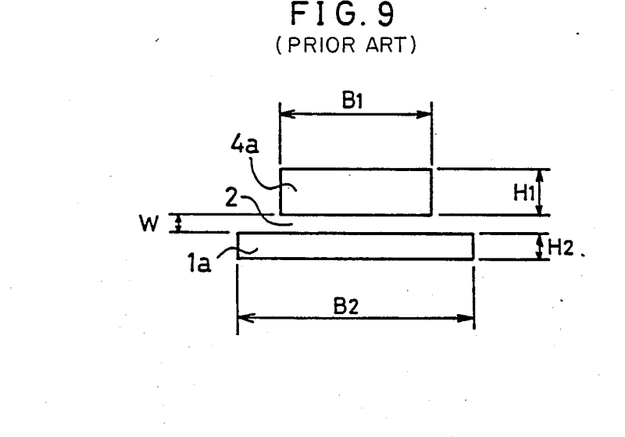
FIG. 9 is a front view showing a throat height.
Figure 10:
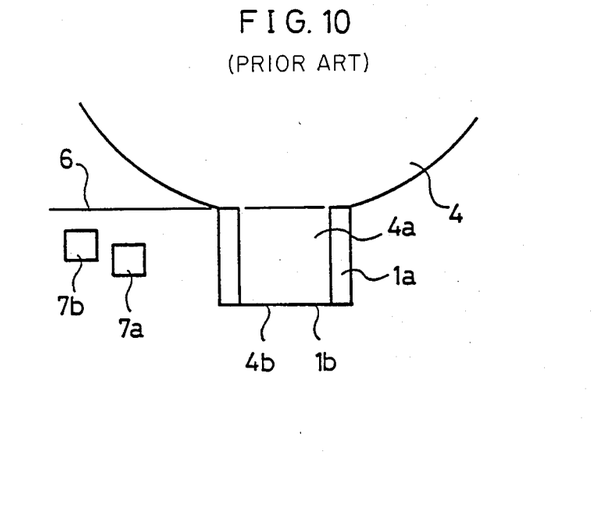
FIGS. 10 and 11 are fragmentary plan view and a fragmentary perspective view showing the magnetic head.
Figure 11:
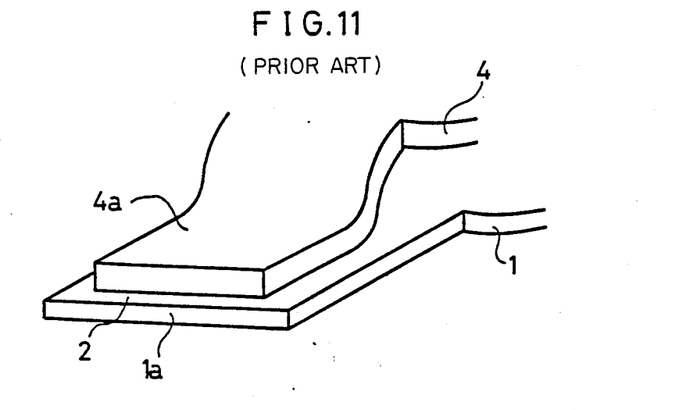

A prior art magnetic head will now be described with reference to FIGS. 8 to 11. Referring to the Figure, reference numeral 1 designates a lower core body, 2 a gap formed on the lower core body 1, 3 a read/write coil (hereinafter referred to as a R/W coil) provided on the lower core body 1, 4 an upper core body formed to cover the lower core body 1 and R/W coil 3. The upper and lower core bodies 4 and 1 form a closed magnetic path. The magnetic head has upper and lower cores 4a and 1a that project from the respective upper and lower core bodies extending parallel to each other via a gap 2. The gap 2 between the upper and lower cores 4a and 1a form a throat height (i.e., depth of gap ) 5. The throat height 5 means the length from a reference position 6 at zero throat height to the ends 1b and 4b, and it determines such performance as the overwrite characteristics or resolution of the magnetic head, so that it is important. FIG. 9 is the shape of the upper and lower cores 4a and 1a in front view. In the Figure, designated at $B_1$ is the width of the upper core 4a, $H_1$ is the thickness of the upper core 4a, $B_2$ is the width of the lower core 1a, $H_2$ is the thickness of the lower core 1a, and W is the length of the gap.

Figure 12:
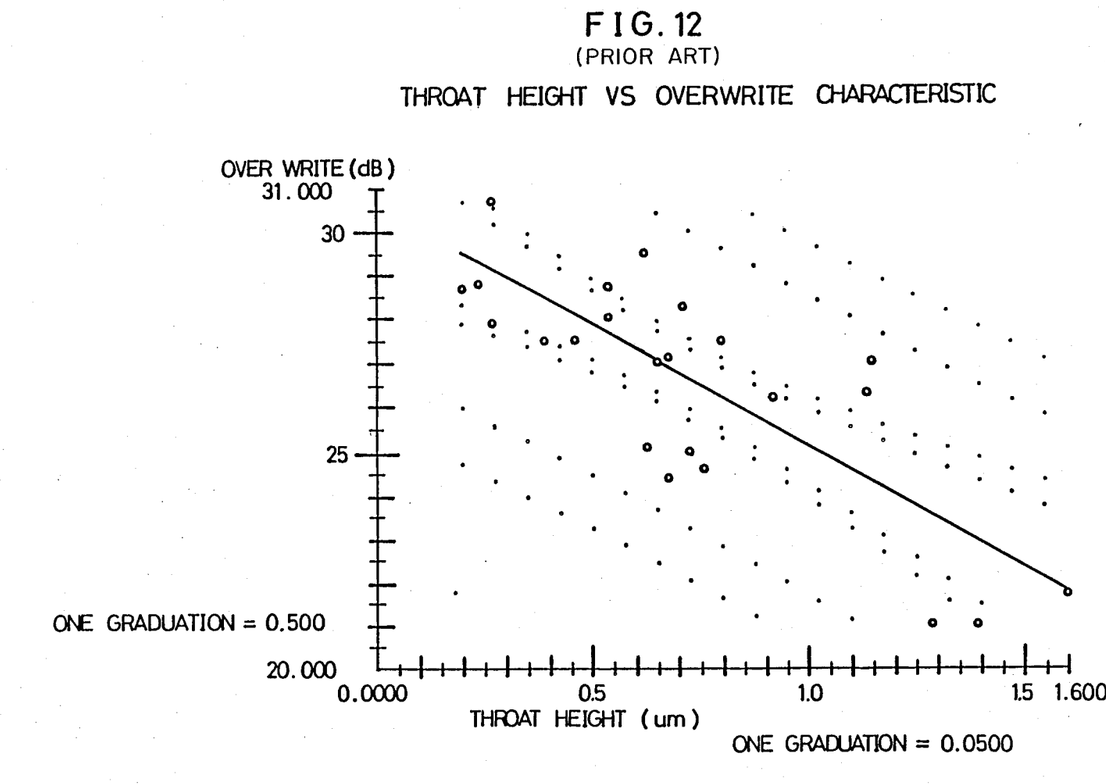
FIG. 12 is a graph showing the relation between overwrite characteristic and throat height.
Figure 13:
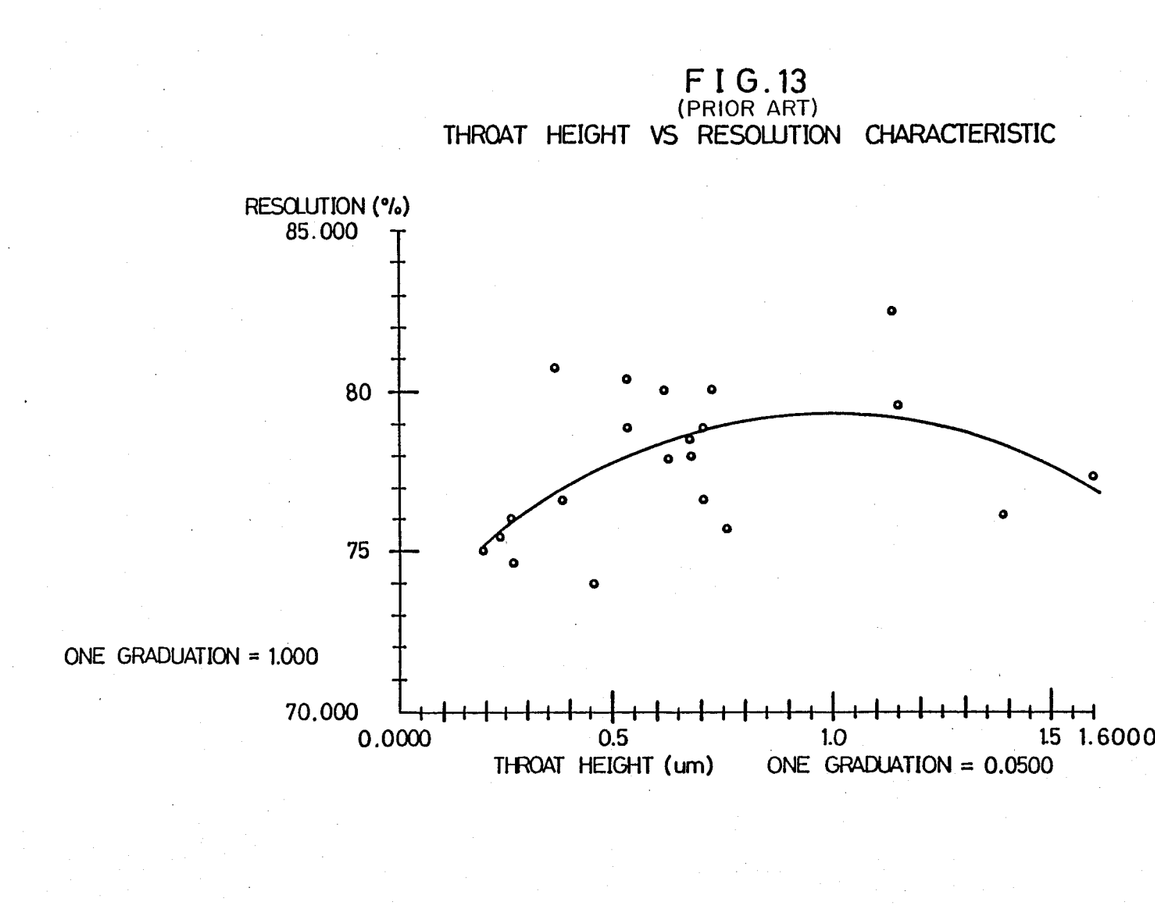
FIG. 13 is a graph showing the relation between resolution and throat height.

FIGS. 12 and 13 show graphs of experimental data representing the overwrite and resolution plotted against the throat height. These data are characteristics of a thin film head having a prior art shape. It will be seen that as the throat height 5 is reduced, the overwrite characteristic is improved, while the resolution is reduced when a certain value is reached.

Thus, the throat height 5 should be controlled in order to satisfy the desired performance.

Figure 14:
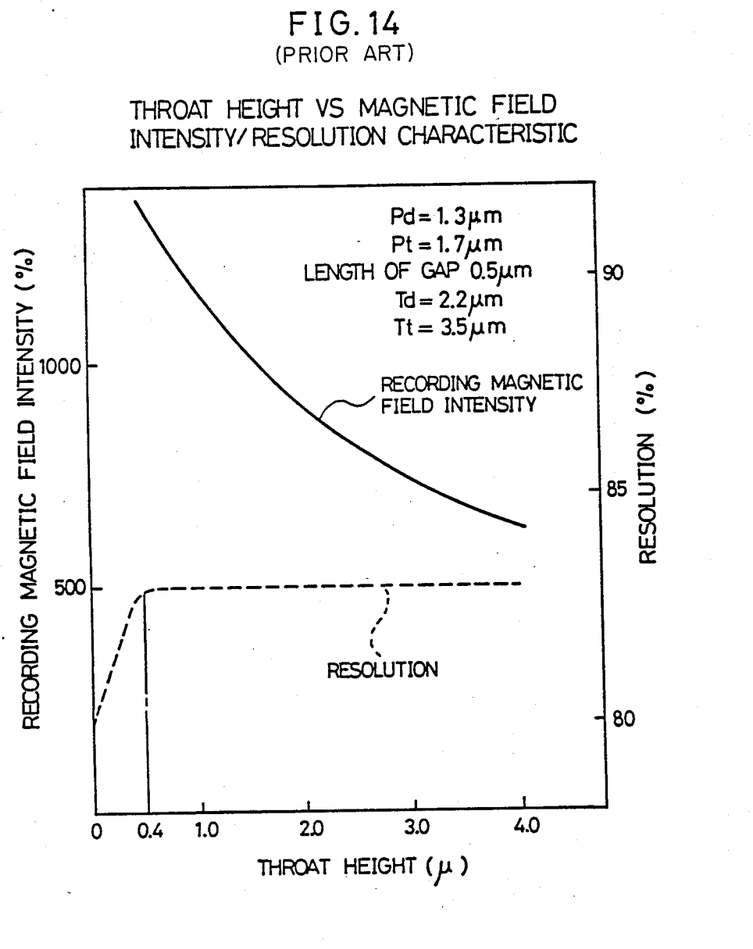
FIG. 14 is a graph showing magnetic field intensity and resolution plotted against throat height obtained by experiments by some other company.

FIG. 14 shows the recording magnetic field intensity and resolution both plotted against throat height which is extracted from a literature published from some company. The magnetic field intensity may be through to be an overwrite characteristic and has a tendency resembling the experimental data of our company. More specifically, the overwrite characteristic may be improved by reducing the throat height, but if the throat height is reduced excessively, the resolution is deteriorated. Therefore, it is necessary to control the throat height stringently to a predetermined size.

As is shown, the throat height 5 is set to a predetermined value by gradually polishing the ends 1b and 4b of the cores to determine the overwrite characteristic and resolution of the magnetic head. More specifically, polishing marks 7a and 7b are provided on a wafer (not shown) as a base of the lower core body 1 with the reference position 6 of zero throat height as A reference, and the cores 1a and 4a are polished gradually from the ends 1b and 4b inclusive of the polishing marks 7a and 7b. If both of the polishing marks 7a and 7b can be seen during polishing, the throat height 5 is excessive. If only the polishing mark 7b is seen, the throat height is slightly excessive. If the two polishing marks 7a and 7b can no longer been seen, the throat height is adequate. If the polishing is excessive, the thickness H of the core 4a is increased, or the length W of the gap 2 is increased. For this reason, heads with excessively polished cores are discarded.

Since the prior art magnetic head has the following construction, unless the positional relation between the zero throat height reference position 6 and polishing mark 7 is correctly set, the polishing marks 7 become meaningless, and accurate polishing can not be obtained. In such a case, the throat height 5 fluctuates with the individual products to fluctuate the overwrite characteristic and resolution and result in generation of rejected products.

SUMMARY OF THE INVENTION

This invention is intended to solve the above problems, and its object is to provide a stable magnetic head, which permits control of its throat height and reduction of fluctuations of the overwrite characteristic and resolution.

According to the invention, there is provided a method of manufacturing a magnetic head, in which the width of upper and/or lower cores is varied stepwise toward the free ends of the cores in advance.

The above and other objects, features and advantages of the invention will become more apparent from the following description when taken in conjunction with the accompanying drawings.

DESCRIPTION OF THE PREFERRED EMBODIMENT

Figure 1:
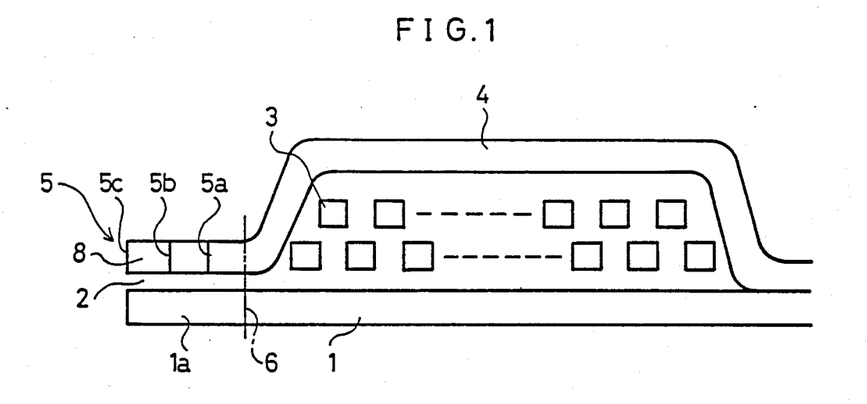
FIG. 1 is a sectional view illustrating a method of manufacturing a magnetic head embodying the invention.
Figure 2:
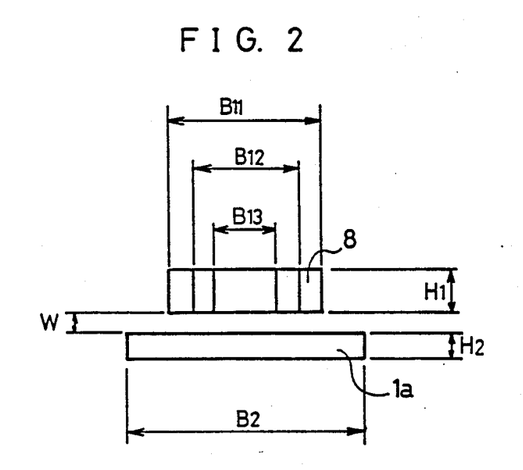
FIG. 2 is a front view showing a throat height section.
Figure 3:
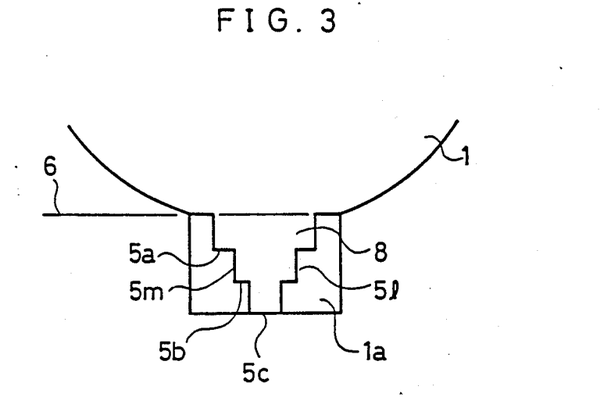
FIGS. 3 and 4 are respectively a fragmentary plan view and a fragmentary perspective view showing magnetic head.
Figure 4:
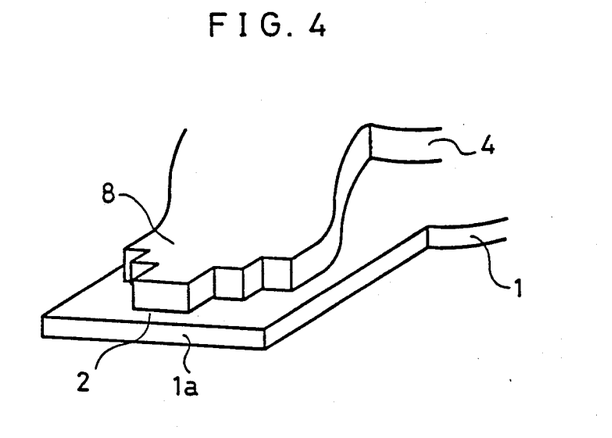

Now, a method of manufacturing one embodiment of the magnetic head according to the invention is illustrated with reference to FIGS. 1 to 4. Parts like those in FIGS. 8 to 11 are designated by like reference numerals with omission of their detailed description. Referring to the Figures, reference numeral 8 designates an upper core projecting from the upper core body 4 and extending parallel with the lower core 1a via gap 2. The upper core 8, as shown in FIG. 3, has a staircase-like shape on both sides $5l$ and $5m$ such that its width is reduced at a first throat height setting position $5a$ and then at a second throat height setting position $5b$ compared to the width at a zero throat height reference position 6. This upper core 8 has a front shape as shown in FIG. 2. It will be seen that the core width is reduced stepwise from $B_{11}$ to $B_{12}$ and then to $B_{13}$. Designated at $H_1$ is the thickness of the upper core 8, $B_2$ is the width of the lower core $1a$, $H_2$ is the thickness of the lower cover $1a$, and W is the length of the gap 2. The relation of the widths $B_{11}$, $B_{12}$ and $B_{13}$ of the upper core 8 and the distance from the zero throat height reference position 6 to the throat height setting positions $5a$ to $5c$ is set as follows.

The width $B_{13}$ of the upper core is set to 1 $\mu$m, the distance from the zero throat height reference position 6 to the free end $5c$ is set to 2 $\mu$m, the width $B_{12}$ of the upper core is set to 2 $\mu$m, the distance from the zero throat height reference position 6 to the second throat height setting position $5b$ is set to 1 to 2 $\mu$m, the width $B_{11}$ of the upper core is set to 3 $\mu$m, and the distance from the zero throat height reference position 6 to the first throat height setting position $5a$ is set to 0 to 1 $\mu$m.

In this construction, the lower and upper cores $1a$ and $8a$ are gradually polished from the end $5c$ while paying attention to the second throat height setting position $5b$. By stopping the polishing immediately before reaching the second throat height setting position $5b$, a core can be obtained, which has a free end coinciding with the second throat height setting position $5b$. Further, by stopping the polishing immediately before reaching the first throat height setting position $5a$, a shorter core can be obtained, which has its free end coinciding with the first throat height setting position $5a$. It is thus positioned to obtain two different magnetic heads having different heights, if required.

Figure 6:
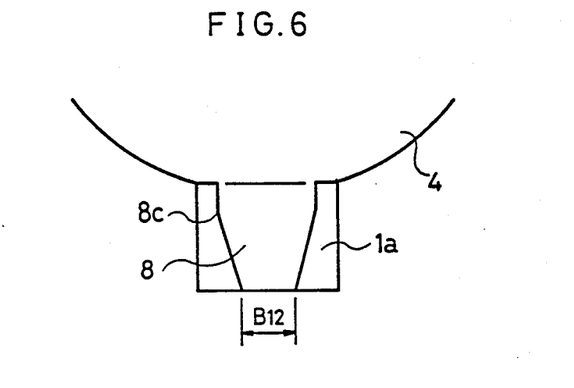

In the above embodiment, the width of the upper core 8 is changed stepwise to provide three different widths. However, it is possible to change the width of the upper core 8 gradually in a tapering fashion from the throat height setting position $8c$ as illustrated in FIG. 6. In this case, by starting the polishing from the free end and stopping it upon reaching the throat height setting position $8c$, a core can be obtained, which has its free end coinciding with the throat height setting position.

Figure 5:
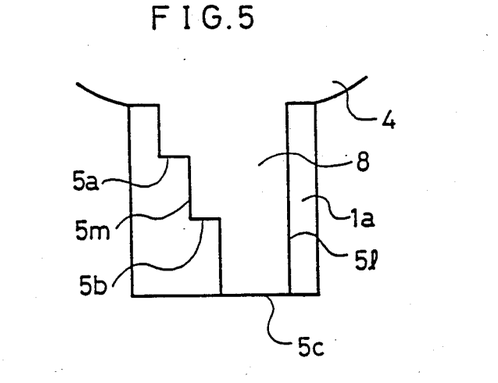
FIGS. 5 to 7 are fragmentary plan views showing different embodiments of the magnetic head according to the invention.
Figure 7:
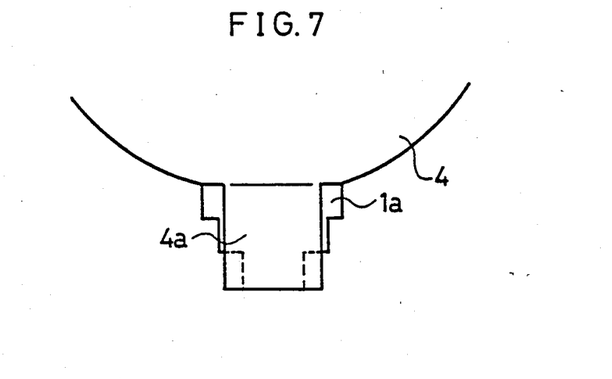
Figure 8:
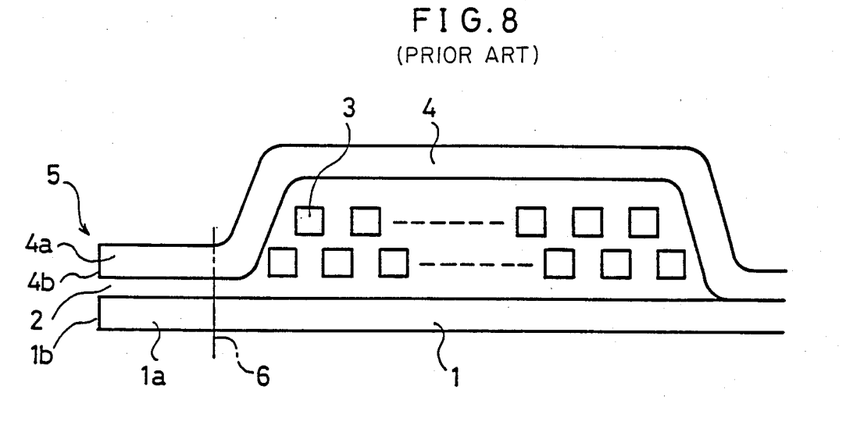
FIG. 8 is a side view showing a prior art magnetic head.

Further, the width of the upper core 8 is changed stepwise, but it is also possible to change the width of the lower core $1a$ stepwise as shown in FIG. 7. Further, the width of both the upper and lower cores 8 and $1a$ can be changed stepwise. Further, as shown in FIG. 5, only either side $5m$ of the upper or lower core 8 or $1a$ may be changed stepwise.

As has been shown, according to the invention the width of the upper and/or lower cores of the magnetic head is changed stepwise toward the free end in advance. Thus, it is possible to machine the end of the head accurately reduce fluctuations of the throat height and obtain highly accurate products.

What is claimed is:

1. A method of manufacturing a magnetic head comprising the steps of: providing upper and lower cores projecting from respective core bodies and extending parallel with each other thereby defining therebetween a transducing gap, said upper and lower cores having free ends spaced from the point where the cores joint their respective core bodies, at least one of said cores having at least one step shaped profile extending between said point and its free end; and machining said cores from the free ends toward the core bodies to obtain a predetermined desired throat height for said transducing gap using at least one step of said profile as a reference point.

2. The method of claim 1, wherein the opposite sides of one of said upper and lower cores has said step shaped profile.

3. The method of claim 1, wherein one side of one of said upper and lower cores has said step shaped profile.

* * * * *